United States Patent [19]

Kahl

[11] Patent Number: 4,898,152
[45] Date of Patent: Feb. 6, 1990

[54] DUAL SEQUENCE SOLAR WATER HEATER

[76] Inventor: Karl H. Kahl, 8 Brian Rd., Chelmsford, Mass. 01824

[21] Appl. No.: 77,601

[22] Filed: Jul. 24, 1987

Related U.S. Application Data

[63] Continuation of Ser. No. 683,210, Dec. 18, 1984, abandoned.

[51] Int. Cl.⁴ ............................................. F24J 3/02
[52] U.S. Cl. ................................. 126/422; 126/362; 126/374; 126/389; 126/437; 126/419; 126/421; 237/19; 122/381
[58] Field of Search ............... 126/435, 420, 400, 417, 126/389, 394, 376, 362, 373, 361, 380, 421, 437; 122/381, 361, 379, 247, 250 S, 249, 250 R, 251, 252, 132, 169, 183, 245, 244, 185; 237/19

[56] References Cited

U.S. PATENT DOCUMENTS

| | | | |
|---|---|---|---|
| 234,645 | 11/1880 | Allington | 237/19 X |
| 2,790,436 | 4/1957 | Pearcy | 126/376 |
| 3,171,387 | 3/1965 | Muller | 237/19 X |
| 4,106,692 | 8/1978 | Bajea | 126/400 |
| 4,130,110 | 12/1978 | Bottum | 126/421 |
| 4,191,166 | 3/1980 | Saarem et al. | 126/420 |
| 4,232,657 | 11/1980 | Killorin | 126/435 |
| 4,326,699 | 4/1982 | Kostela | 126/438 |
| 4,369,964 | 1/1983 | Thomason et al. | 126/400 |
| 4,397,794 | 8/1983 | Manabo | 126/435 |
| 4,440,152 | 4/1984 | Leflor et al. | 126/435 |
| 4,562,828 | 1/1986 | Koshela | 126/435 |

FOREIGN PATENT DOCUMENTS

| | | | |
|---|---|---|---|
| 2638834 | 3/1978 | Fed. Rep. of Germany | 126/435 |
| 2239260 | 3/1981 | U.S.S.R. | 237/19 |

Primary Examiner—Carl D. Price
Attorney, Agent, or Firm—Pearson & Pearson

[57] ABSTRACT

The invention represents part of well known solar drain-back systems which store and transfer the collected solar heat to a conventional home hot water system. Heat transfer occurs only while hot water is being drawn, i.e. during water flow through heat exchangers located in a solar liquid storage tank. A thermally well insulated liquid storage tank receives heat by circulating the stored liquid over a conduit through solar energy collectors which are located such that gravitational drainage of the liquid back to the tank is assured. The unpressurized and vented liquid storage tank has external level indicator for seasonal changes of liquid storage volumes.

A pipe having heat exchange turns is located in the area above the highest of the variable liquid storage levels in the tank, the pipe and conduit are sealed to form a double pipe counterflow section. A pump when active, circulates the liquid from near the bottom of the tank to the solar heater and then to the conduit. When the pump is inactive, the liquid back-flows by gravity. A vacuum breaker located inside the tank, allows the back-flow to drain the solar heater and facilitates exchange of liquid and air or vapor from inside the tank by preventing vacuum lock.

10 Claims, 2 Drawing Sheets

DUAL SEQUENCE SOLAR WATER HEATER

This is a continuation of application Ser. No. 683,210 filed Dec. 18, 1984, now abandoned.

FIELD OF THE INVENTION

The invention relates to a system and method for heat exchange between a solar heater and a water supply, and a tank arrangement for use with the system.

BACKGROUND OF THE INVENTION

It has been suggested to transfer the heat from the liquid heated by a solar heater to a household water supply. For example, U.S. Pat. No. 4,253,446, Mar. 3, 1981 to Muller for "Storage Reservoirs for Liquids Heatable By Solar Energy" suggests that a coil warmed by solar heated liquid be immersed near the bottom of a liquid storage reservoir, and another heat transfer coil carrying potable water be immersed in the reservoir to receive heat from the reservoir. In this manner, the heat from the solar heater is used to heat the potable or household water supply.

U.S. Pat. No. 4,232,657 to Killorin Nov. 11, 1980, for "System For Use With Solar Collector" describes a proposed system in which the heated liquid from the solar heater is circulated by a pump through an insulated, unpressurized tank. Storage or heat exchange liquid from the tank circulates to a waste heat source. A control unit connected to sensing elements controls pumping by two pumps as needed. A heat exchange coil within the tank heats potable water for local use. A booster heater connected to the hot water line maintains a minimum temperature in the potable water supply in the event of low temperature levels in the storage tank.

The suggestions of these patents are typical of prior proposals for systems and methods which use the heat provided by liquid heated by a solar heater to heat a water supply, such as that for a household.

SUMMARY OF THE INVENTION

The system, according to the invention, comprises a vented tank, a conduit connected to carry the stored liquid to a solar heater and heated liquid from the solar heater or collector, through an upper portion of the tank above a normal liquid level and then discharge the liquid into the tank below that level. A pipe having turns in heat exchange with liquid in the tank, carries potable water from the cold, potable water supply upwardly from below the normal liquid level, and then above this liquid level for the first heating sequence.

In the region above the liquid level, one of the pipe and conduit envelops the other, so that there is a good heat exchange between solar heated liquid and potable water in that region, but the water and liquid are isolated from each other. Thus, in operation, when solar heated liquid and potable tap water both flow, the tap water is heated by solar heated liquid in the lower reservoir portion of the tank, and then further heated by solar heated liquid from the solar heater in a jacket around the tap water pipe, as the second heating sequence.

In the method according to the invention, the liquid from the solar heater is stored, the temperatures of the stored water and the water being solar heated are compared, and when the latter exceeds the former by a selected amount, water is circulated over the solar heater through the space above the stored liquid and then discharged into storage. If, during solar liquid circulation, potable water is drawn through heat exchange with the stored liquid, then drawn in counterflow heat exchange with the liquid from the solar heater, as the solar heated liquid is being led to storage above the surface of the stored liquid, then the potable water being drawn receives an additional temperature rise due to heat exchange with the warmer water direct from the solar heater.

A common electronic control system is used for sensing the temperature of the liquid in the solar heater, comparing that sensed temperature with the sensed temperature of the liquid in the tank, and when the temperature in the former exceeds that in the latter by a specified differential, activating the pump, and pumping the liquid from the tank to the solar heater, thence through the conduit in the upper portion of the tank, and then discharging the liquid into the lower, liquid filled portion. An important feature involves the location of a vacuum breaker inside the tank above the liquid for assuring that a vacuum condition does not impede the gravity return flow of the liquid from the solar heater when the pump is deactivated. When the circulation is stopped, the whole volume of liquid in the collectors and solar loop lines exchanges with the air, or vapor, in the tank. For this exchange, the vacuum breaker's important function is to let the tank air enter the solar loop rapidly for safe and complete liquid drainage. In this exchange of liquid with air, no combined volume change occurs at constant temperatures of liquid and air and no communication with the tank surrounding outside air is needed; but since temperature changes are constantly taking place with the associated volume changes, venting of the tank is necessary. The temperature changes though occur slowly and are, therefore, accommodated by a vertcal vent pipe which is filled with a suitable, labyrinth forming metal wool. In the extended cooler section of this vent tube outside the tank, the vapor condenses and the liquid flows back into the tank while the air is expanding very slowly through the tube, thus prventing storage liquid loss.

Locating the vacuum breaker outside the solar storage tank would mean rapid introduction of outside air into the solar loop during the drain-back phase with resulting forceful and spontaneous vapor release and loss of liquid through the vent tube. The pump is automatically deactivated whtn the temperature differential of the collector and the tank has decreased to a specified minimum, or when the temperature of the storage liquid has reached the pre-set maximum.

DESCRIPTION OF THE DRAWINGS

The various objects, advantages, and novel features of the invention will be more fully apparent from the following detailed description, in which like reference characters refer to like parts, when read in connection with the accompanying drawing in which.

DETAILED DESCRIPTION

Figure 1:
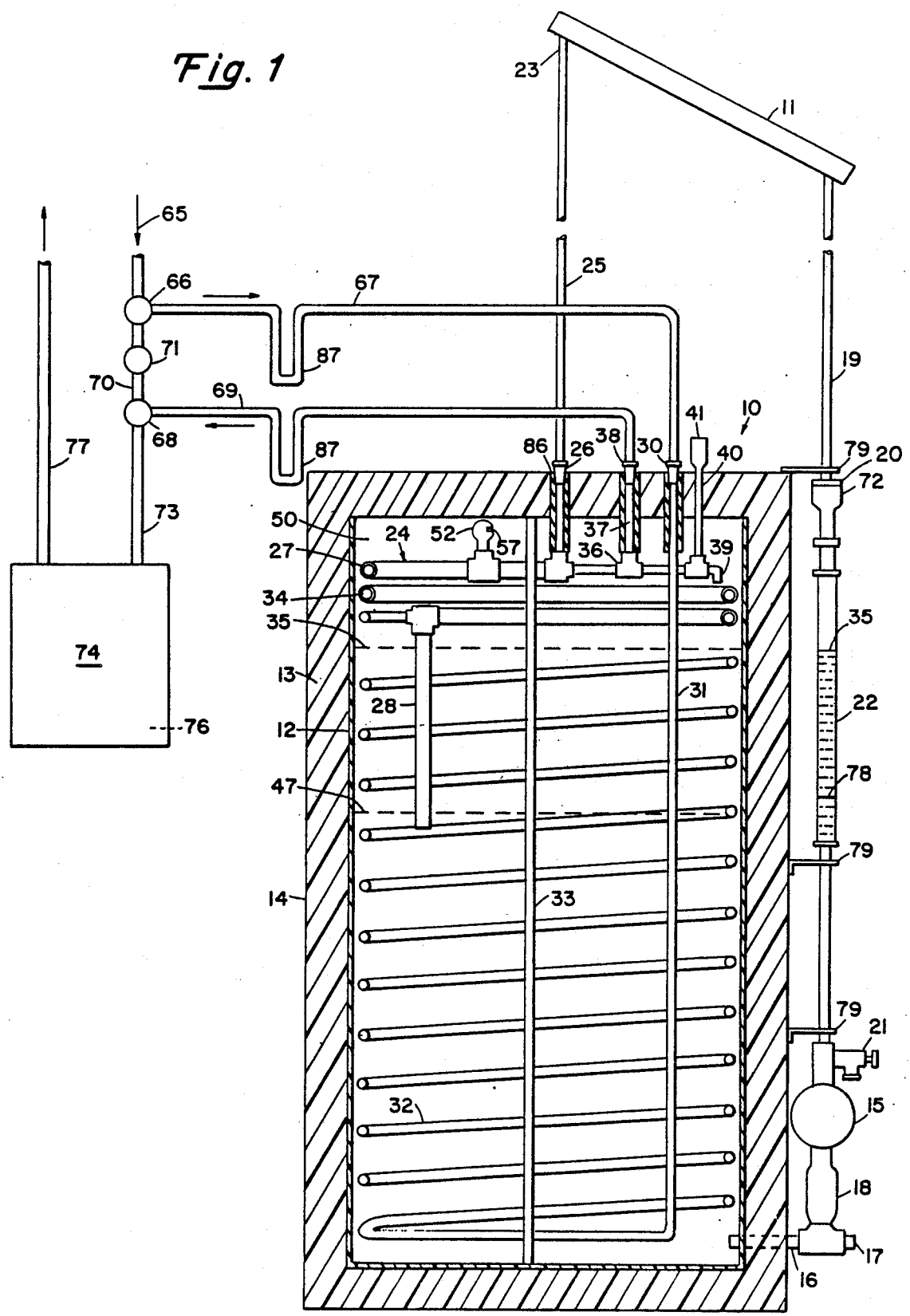
FIG. 1 is a diagrammatic, front elevation, partly in section, of an embodiment of the invention.
Figure 2:
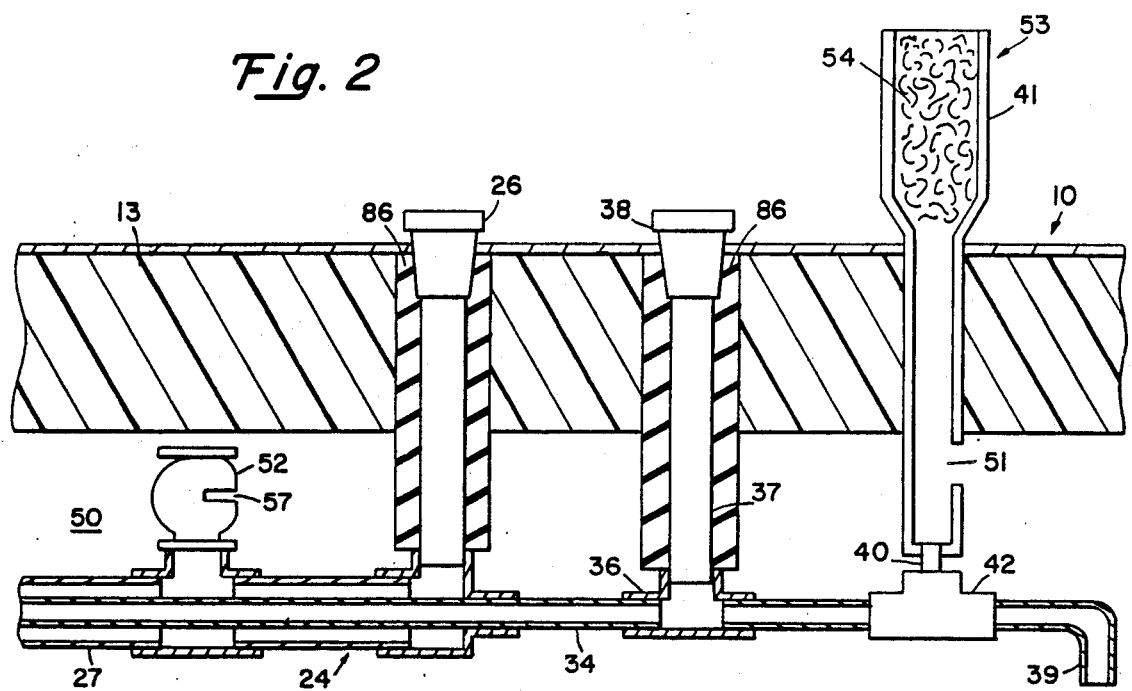
FIG. 2 is an enlarged, fragmentary, sectional front view showing the various inlets, outlets, turn rods, and the vacuum breaker.
Figure 3:
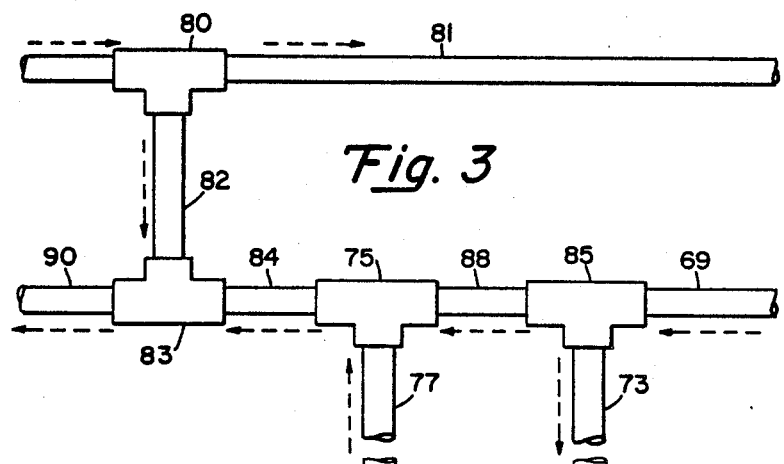
FIG. 3 is a schematic, fragmentary, detail view of another embodiment of the connections to the household tap water heater.

Referring to FIGS. 1 through 3, a storage tank 10 affords storage for a liquid (i.e., a heat transfer liquid) heated by a solar heater 11, which may comprise one, or several, solar collector panels. The tank 10 has a lining of polyethylene 12, is insulated with a double layer of foam insulation 13, and has an outer sheet metal enclosure 14, vestigially indicated, but entirely surrounding the insulation 13. The tank 10 is shaped, sized, and dimensioned, at about 28 inches wide and 71 inches high so that it will easily pass through the doorways of the average dwelling.

A pump 15 is connected to a drain outlet 16 near the bottom of the tank 10. A drain plug 17 is provided for tank drainage when required. A circulator shut-off valve 18 between the pump 15, and the drain 16, allows pump replacement without tank drainage. A conduit 19 in the form of a pipe leads from the pump 15 to a fitting 20 for connection to the inlet of the solar heater line. A drain faucet 21 near the pump on the fitting side is for draining liquid from the solar heater, and adjusting the liquid height in the tank 10. A visual gauge 22 for observing liquid height inside the tank 10 is inserted in the stretch of conduit 19 between the pump 15 and the fitting 20.

The return flow, when the pump is active, leads the liquid from the outlet 23 of solar heater 11, to a return conduit 25, which leads into fitting 26, which in turn, directs the liquid into a double pipe 24, the outer conduit or pipe 27 carrying the return heated liquid from the solar heater 11 and fitting 26. The outer conduit 27 is continued in several turns or convolutions, preferably as a coil, inside the upper part of the tank 10, and then communicates with a vertical stretch 28 of single-conduit through which the liquid is discharged into the interior of the storage container 10. References herein to up, down, top, bottom, etc. are descriptive of the system when oriented for use.

A fitting 30 serves to provide an inlet for the potable water supply through a vertical stretch of pipe 31 within, and toward the bottom of the tank 10. Near the bottom of the tank the potable water pipe continues with turns 32, preferably as a coil, inside the tank. The coil 32 continues to near the top of the tank 10, and is supported by supports 33.

In the upper portion of the tank, above the liquid level 35, designed as the highest upper liquid level in the tank 10, the single pipe coil 32 is sealed within the outer conduit 27, and continues interiorly of outer conduit 27 as the interior of a double pipe, or double coil 24, the outer conduit 27 carrying inside of itself the inner pipe 34, as a continuation of the coil 32. Thus, the inner pipe 34 carrying the potable water does not communicate with the interior of the outer conduit 27, and the liquid and water do not mix. At the junction of the fitting 26, with the conduit 27, the outer wall of the inner pipe 34 is again sealed to the inner wall of the outer conduit 27, but the pipe 34 is continued horizontally to a junction 36, with a vertical outlet 37, to a fitting 38 from which heated potable water may be drawn. The other branch from the junction 36, leads to an outlet 39 into the tank. The outlet 39 is controlled by valve 42 through rod 40 and an exterior handle 41, which forms a vent condenser 53.

A vacuum breaker 52 is installed inside the tank 10. The vent condenser 53 leads upwards to afford a path 51, exterior of the tank 10. This path is filled with a fine non-organic, non-liquid absorbing wool 54, formed for example, from a metallic material such as copper, or other non-rusting material of good thermal conductivity. The path of vent condenser 53, and the vacuum breaker 52 communicate with the upper portion 50 of the tank 10, directly to admit or discharge air from or to, the upper portion 50, of the interior of the tank 10, leading to and from the mouth 57 of the vacuum breaker 52. The mouth 57 communicates through the vacuum breaker 52, as well known in the art, with the outer conduit 27, so that if the pressure in the interior of the conduit 27 is less than the pressure at the mouth 57, air or vapor is admitted to the interior of the conduit by that vacuum breaker. This condition occurs when the circulating pump 15 is stopped and the liquid drains back from the collectors, whereby the returning liquid is exchanged with air from inside the tank. Temperature changes only require slow venting through path 51 to compensate resulting volume changes.

A common control circuit 100 may be powered for a conventional 115V supply 101. The circuit 100 receives signals from a temperature sensor 102 located at the solar heat collectors and temperature sensor 103 at the liquid storage tank. The control circuit 100 controls the activation of the pump 15, and may carry power for the pump, or control a relay 104, or the like. Such circuits as control units with temperature sensors are readily commercially available.

The system as thus far described, may be installed to connect with a household potable water supply which may receive water from a source indicated by arrow 65. To make such a connection in an already active household water supply, the incoming water supply is broken and a valve 66 installed near the source. A line 67 from the valve 66 is inserted leading to inlet fitting 30. At a point in the initial potable water line more remote from the source 65, another valve 68 is installed leading via line 69, to the fitting 38. In the line section 70 between the valves 66 and 68, a further cut-off valve 71 is installed so that, if desired, the valves 66 and 68 may be turned to admit water flow from the source directly through the open valve 71, through the line 70 and through the valve 68, on to the household supply, which can then operate as before the installation. Thus, if desired, the newly installed system may be interconnected to the household supply to turning valve 71 to a cut-off, and turning valves 66 and 68 to communicate respectively with fittings 30 and 38.

From the valve 68 the household supply continues through a line 73 and into any type of household hot water heater 74. The installation of valves 66, 68, and 71 into the cold water supply line 65 as shown on FIG. 1, and the connection of the two pipe leads 67 and 69 to the tank 10 completes the interface of the Dual Sequence Solar Water Heater with the home hot water heater. A heat supply, such as a gas flame 76, controlled by the usual thermostatic controls (not shown) may boost the water temperature in the hot water tank 74 when needed, and from thence, the water is drawn in the customary manner via suitable hot tap water piping 77 to the house.

After installation of the system as shown in FIG. 1, the tank 10 may be filled as explained hereinafter, and the electrical power applied to the common control unit circuit 100. The control circuit includes a comparison circuit, which will compare the solar collector temperature as measured by the temperature sensor 102 with the liquid temperature of the storage tank as measured by the temperature sensor 103. If the temperature at the collector is, for example, 12° F. above that of the stored liquid in the tank, the pump is activated, and the liquid will flow to the solar collectors 11. The return flow into the tank at return conduit 25, and fitting 26, generally speaking, simply displaces an equal volume in the tank 10, the total volume in tank 10, and the conduits remaining approximately constant. Level 47 is the lowest design level for the liquid. The return flow from the vertical stretch or discharge conduit section 28 is a little below this lowest design level to reduce noise and minimize vapor formation. As long as the temperature differential between the liquid in the solar collectors and the liquid in the storage tank is, for example, above 4° F., the flow will continue. If the difference in temperature falls to less than 4° F., the comparison circuit 105 in the control unit causes the pump 15 to be deactivated.

After the pump stops, there being a pressure head due to the liquid in the solar heater being located higher than the tank, a return flow commences. The vacuum breaker 52 permits a flow of air from the upper part of the tank 10, into the return conduit 25 towards the collectors 11, to replace the vacating liquid. This action occurs because the total volume of the tank, the conduits from and to the solar collectors 11, and the liquid in the solar collectors 11, remains about the same. As liquid back-flow through conduits 19 and 25 enters the tank 10, it displaces a substantially equal volume of air and vapor at the upper part 50 of the tank 10, which in turn, flows into the valve of the vacuum breaker 52, toward the solar heater 11. A vacuum lock is thus prevented which might obstruct the back flow, when the pump 15 is inactive, which could result in incomplete draining of the solar heater 11.

Nevertheless, there are occasions when, due to changes in temperature, the air vapor, and liquid in tank 10 slowly expand or contract with resulting slight volume changes. In order to compensate for these minor volume differences without loss of liquid, the vent is filled with a non-organic, non-liquid absorbent wool, for example, a metallic wool made of copper or other materials of good thermal conductivity, to facilitate condensation. The air in the upper part of the tank 10 is normally moisture laden. The metallic wool, as exposed to the tank outside and thus lower in temperature, acts to condense the moisture, and return the liquid by gravity to the tank. Consequently, the vacuum breaker serves to protect the system from a vacuum lock while the addition of the metallic-wool filled vent channel, compensates for minor liquid volume and vapor density changes in the tank 10.

Desirably, any readily available adjustable flow regulator and meter 72 is inserted in the line 19 near the exit fitting 20. Suitable support brackets and the like, are used wherever required, only a few such as 79 being shown. The flow rate from the pump 15 may be monitored and manually controlled by the adjustable flow regulator and meter 72 to achieve the design flow rate for optimum heat transfer and to avoid excessive flow which might lead to accelerated erosion. The storage tank lining 12 is sealed in so far as possible, at the top and insulation linings 86 are provided at any tank exits or entrances to insure good insulation and to minimize heat loss.

Generally speaking, the incoming cold water may enter at a temperature of about 50° F., as experienced in the Northeastern part of the United States. After connecting the system, the valves 66, 68, and 71 being set for water flow through the solar system. The tank 14 is filled, with the pump 15 off, by opening the outlet valve 39 by means of a handle 41, to admit water into the storage tank 10. In Winter it is desirable to store less liquid than in Summer. Assuming a Winter time preparation, the gauge 22 is observed to set the liquid level, for example, at about 100 gallons of liquid in a 158 gallon tank indicated as the level 78, and as observed and indicated by the indicator tube 22. If it is Summer time with more solar heat input, more liquid may be admitted, for example, to the level of 150 gallons as indicated by the level 35. The valve 39 is closed when the appropriate level is observed in the gauge 22. When the pump 15 is active, the level in the tank 14 is reduced somewhat due to the amount of liquid in the solar heater and in the conduits. Consequently, a somewhat lower level 47 is the lowest liquid design level.

Figure 4:
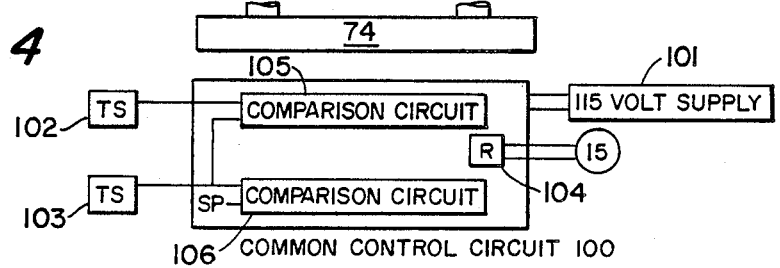
FIG. 4 is a schematic of a control circuit useful in the operation of this invention.

If at any time the sensor (represented by reference numeral 103 in FIG. 4) of the liquid in the storage tank detects a temperature in the liquid in the tank that exceeds a set maximum, usually 180° F., as represented by a set point signal SP on FIG. 4, another comparison circuit 106 in the common control circuit 100 acts to cut off power to the pump 15. The liquid then in the solar heaters 11 returns to the tank, as described, avoiding boiling of the liquid whose temperatures may be as much as 20° F. higher than that of the liquid in the storage tank.

The water drawn from the hot water heater 74 is replaced by water flowing through the pipe 32. In describing the situation with the circulating pump not active, the pipe being in good heat exchange relation with the liquid stored in the tank, the water is heated as it is drawn, so that water entering the hot water heater is already boosted in temperature to near, say within about 5° of the average of that of the liquid stored in the storage tank 10, instead of entering the common home hot water heater at the near nominal ground temperature of 50° or even less.

If the solar liquid circulating pump is active as the water is drawn, however, a substantial improvement is secured. At that time, the liquid returned in the outer conduit 27 is at a relatively high temperature coming as it does directly from the solar heater 11. As before, the water in the pipe 32 is first heated to within about 5° of the average temperature of the liquid in the tank 10 through which the pipe 32 passes. Then, as the potable water passes through the double pipe 27-34, the water receives an additional heating by the counterflow heat exchange in the double pipe. Thus, the cold potable water which enters the home at a temperature of 50° F. could heat up to near the maximum of 180° before entering the conventional home hot water system when hot water is being drawn, although the temperature of the liquid in the tank may have reached only 165° F. average at the time. The temperature difference of the stored liquid in the tank 10 between the top and bottom areas was found to be less than 3° F. during liquid circulation.

This system and method of operation provides a greater efficiency than in prior systems. Note that only a single pump is required which draws little household current, and note also that the control circuit may employ solid state elements and requires comparatively small amounts of current. Thus, the energy requirements to operate the system are relatively very small.

Instead of the simple interconnection of the Dual Sequence Solar Water Heater with the potable hot water supply, as shown in FIG. 1, a different interconnection is illustrated in FIG. 3 for a further increased efficiency. A junction 80 in the cold water inlet line has one branch 81 connected to supply the cold potable water inlet 30 of the tank 10. The other branch 82 leads to an automatic tempering valve 83. Line 69 connects the solar heated water, coming from connection 38 at the tank 10, to a thermal two-way valve 85, which directs the solar heated water over line 73 to the home water heater 74, as temperatures booster when necessary, or over line 88 at junction 75. Connection 75 receives solar heated water direct from the thermal two-way valve through line 88 or after temperature boost at certain conditions by the home heater 74 over line 77. The junction exit line 84 leads to the automatic tempering valve 83 which injects cold water from line 82 into the home hot water line 90, thus preventing overheated water from reaching the hot water faucets, etc.

With this installation the thermal two-way valve 85 directs water flow into the tempering valve 83 when the water temperature is at, or above, a pre-set point, usually about 120° F. At higher temperatures, the tempering valve 83 injects cold water into the hot water line to reduce the temperature into the branch 90 to a safe value of 120° F. When the water received from line 69 is lower than 120° F., the automatic thermal two-way valve 85 directs the water over the branch 73. to the house water heater 74. Dotted arrows adjacent the various pipes in this figure indicate in a general way the direction of potable water flow at both conditions.

In one thoroughly tested design, the solar heater 11 comprises three solar panels, with a combined aperture area of 65 square feet, located at a 42° angle on a roof of a two-story home, about 15° solar south and unobstructed. This installation was in the Boston area, near 42° north latitude. The unpressurized polyethylene tank 10 had a total capacity of 158 gallons, including air volume. The immersed heat exchanger used about 100 feet of 5/8" O.D. copper tubing for the section of pipe 32 in the tank 10. The dual heat exchange section 27–34 portion was about 20 feet long and of 5/8" O.D. inner copper tubing in a 7/8" O.D. outer copper tube, located in the air space 50 above the 150 gallon maximum water storage level 35. The insulation 13 was R32 polyisocyanurate foam insulation around top, bottom, and all sides, to a thickness of about 4". The tank 10 had a total sheet metal enclosure 14. The pump 15 was externally located, as indicated, as was the liquid level indicator 22. All pipe and conduit connections outside the tank 10 were provided with surrounding insulation. In addition, the water connections had heat traps 87 to prevent heat losses through thermal syphon action in the connecting pipes during intervals of no flow.

Heat losses from the tank 10 were thus about 3° in 24 hours at a room temperature of about 70° F. and stored temperatures of up to 180°.

When liquid is not circulated by the pump, the differential of top and bottom liquid temperatures can go as high as 40° F.; during liquid circulation the temperature differential of top and bottom liquid in the tank 10 reduces to less than 3° F. Although the upper heat exchanger, the double pipe section 27–34 is without insulation located in the air space 50 above the stored liquid in the tank 10, heat losses go into the air inside the tank, which has a high humidity, or water content, but this vapor is for the most part recovered eventually with substantially no heat loss, by condensing onto the liquid in the tank 10. The metal wool 54 inside the vent passage 53 conserves liquid because of slow "breathing" due to volume changes resultant from temperature variations, and vapor outflow condenses on the metallic wool and the liquid flows back into the tank 10.

A controlled flow rate of the liquid is desirable for most efficient heat transfer and to minimize erosion. Therefore, the flow meter rate of meter 72 is adjusted in relation to installation conditions and average potable hot water usage. An adjustment of about 2 gallons per minute was used in the stated example. The installation as described has been found highly efficient for a household of four people and contributed substantially to the energy required to maintain potable water at desired temperatures for household usage. It was soon found that with the second heat exchanger active, the potable water temperature, after being heated by the solar storage liquid, was boosted up between 10 to 20 degrees, depending on flow rate and other parameter variations. For example, while using hot water at a flow rate of 4 gallons per minute (washing machine), the cold potable incoming water was heated by the stored liquid from 43° F. to 123° F., a differential of 80° of which the second stage heat exchanger contributed 17°.

Based on a daily average hot water use of 100 gallons at 120° F. and a flow rate average of 2 gallons per minute, the solar tank water average temperature experienced was mainly between 100 and 180° F., storage heat losses of no more than 3° F. per day, the solar system provided between 80 and 90% of the hot water during the 12 months of testing.

What is claimed:

1. In a heat exchanger means for receiving the water for transferring to water, being conveyed from a water source to utilization means, heat from a transfer liquid heated in solar panel means, said heat exchanger means comprising:

A. closed tank means for storing the transfer liquid in lower and middle volumes thereof and including first and second ports for the transfer liquid, a third port for connection to the water source and a fourth port for connection to the utilization means;

B. circulating means for circulating the transfer liquid from said first port through the solar panel means to said second port;

C. multi-turn heat exchange coil means coextensive with said lower and middle tank volumes and having an outlet means in said upper tank volume and inlet means connected to said third port for receiving water from the water source to be heated by the transfer liquid in the tank;

D. multi-turn counterflow heat exchanger means with inner and outer liquid passage means located in the upper tank volume above the heat exchanger liquid level, said inner passage means being connected between said heat exchange coil outlet means and said fourth port thereby to complete a closed path between the water source and the utilization means and said outer passage means being connected to said second port to receive heated transfer liquid from the solar panels;

E. discharge means extending from said outer passage means to said lower tank volume for conveying all transfer liquid from said outer passage means to a point below the transfer liquid in said tank thereby to complete a closed-loop transfer liquid path;

F. vacuum breaker means connected to said outer passage means in said upper tank volume for breaking any vacuum in said closed transfer liquid path with air from said upper tank volume, G. vent means for metering the transfer of air between said upper tank volume and the exterior of said tank.

2. A heat exchanger as recited in claim 1 wherein said tank means comprises a thermally insulated container means for storing the water.

3. A heat exchanger as recited in claim 1 wherein said vent means comprises means defining an air path between the interior of said tank means and the exterior thereof and an inorganic, non-liquid absorbent material located in said air path thereby to condense water vapor in any air escaping from the interior of said tank.

4. A heat exchanger as recited in claim 3 wherein said inorganic material is metallic wool.

5. A heat exchanger as recited in claim 3 wherein said inorganic material is copper wool.

6. A heat exchanger as recited in claim 1 wherein said circulating means comprises pump means for pumping transfer liquid and said heat exchanger additionally comprises means for sensing the temperature of the transfer liquid in said tank means and the temperature at the solar panel means and pump control means connected to said temperature sensing means for energizing said pump means thereby to circulate the transfer liquid when the temperature at the solar panel means is incrementally greater than the temperature of the transfer liquid.

7. A heat exchanger as recited in claim 6 wherein said pump control means additionally comprises means for de-energizing said pump means when said temperature sensing means indicate the temperature of the transfer liquid in said tank means exceeds a predetermined temperature.

8. A heat exchanger as recited in claim 1 wherein the utilization means is constituted by a hot water heater with an input for connection to the water source constituted by a water supply, said heat exchanger additionally comprising valve means for directing the water from the water supply to said third port means and from said fourth port means to the water heater whereby said heat exchanger preheats the water from the supply before it enters the hot water heater.

9. A heat exchanger as recited in claim 8 wherein said valve means comprise mixing valve means for combining the heated water from said fourth port means and water from the water source.

10. A heat exchanger as recited in claim 1 additionally comprising valve means in said tank means connected to said fourth port means for supplying water as the transfer liquid, said vent means including a rotatable handle means passing through said tank means to said valve means for controlling said valve means from the exterior of said tank.

* * * * *